(12) United States Patent
    To et al.

(10) Patent No.: US 10,509,969 B2
(45) Date of Patent: Dec. 17, 2019

(54) DYNAMIC PERSON QUEUE ANALYTICS

(71) Applicant: Cisco Technology, Inc., San Jose, CA (US)

(72) Inventors: Victor Tsekay To, Sunnyvale, CA (US); Feng Jiang, San Jose, CA (US); Nham Van Le, San Jose, CA (US); Hugo Latapie, Long Beach, CA (US); Enzo Fenoglio, Issy-les-Moulineaux (FR)

(73) Assignee: Cisco Technology, Inc., San Jose, CA (US)

(*) Notice: Subject to any disclaimer, the term of this patent is extended or adjusted under 35 U.S.C. 154(b) by 151 days.

(21) Appl. No.: 15/702,061

(22) Filed: Sep. 12, 2017

(65) Prior Publication Data

US 2019/0080178 A1    Mar. 14, 2019

(51) Int. Cl.
    *G06K 9/00*    (2006.01)
    *G06K 9/32*    (2006.01)
    *G06K 3/02*    (2006.01)

(52) U.S. Cl.
    CPC ..... *G06K 9/00778* (2013.01); *G06K 9/00751* (2013.01); *G06K 9/00771* (2013.01); *G06K 3/02* (2013.01); *G06K 9/3233* (2013.01)

(58) Field of Classification Search
    None
    See application file for complete search history.

(56) References Cited

U.S. PATENT DOCUMENTS

| | | | | | |
|---|---|---|---|---|---|
| 5,581,625 | A | * | 12/1996 | Connell | G06K 9/00778 382/100 |
| 5,953,055 | A | * | 9/1999 | Huang | G06K 9/00228 348/149 |
| 9,426,627 | B1 | | 8/2016 | Logan et al. | |
| 2002/0168084 | A1 | * | 11/2002 | Trajkovic | G06K 9/00778 382/100 |
| 2003/0107649 | A1 | * | 6/2003 | Flickner | G06K 9/00362 348/150 |

(Continued)

OTHER PUBLICATIONS

Parameswaran, et al., "Design and Validation of a System for People Queue Statistics Estimation", Video Analytics for Business Intelligence. Studies in Computational Intelligence, vol. 409, 2012, 19 pages, Springer Berlin Heidelberg.

(Continued)

*Primary Examiner* — Fernando Alcon
(74) *Attorney, Agent, or Firm* — Behmke Innovation Group LLC; James Behmke; Stephen D. LeBarron

(57) ABSTRACT

In one embodiment, a device identifies, from image data captured by one or more cameras of a physical location, a focal point of interest and people located within the physical location. The device forms a set of nodes whereby a given node represents one or more of the identified people located within the physical location. The device represents a person queue as an ordered list of nodes from the set of nodes and adds a particular one of the set of nodes to the list based on the particular node being within a predefined distance to the focal point of interest. The device adds one or more nodes to the list based on the added node being within an angle and distance range trailing a forward direction associated with at least one node in the list. The device provides an indication of the person queue to an interface.

16 Claims, 12 Drawing Sheets

(56) References Cited

U.S. PATENT DOCUMENTS

| | | | |
|---|---|---|---|
| 2005/0093697 A1* | 5/2005 | Nichani | G06K 9/00778 340/545.1 |
| 2005/0117778 A1* | 6/2005 | Crabtree | G06K 9/00771 382/103 |
| 2012/0207350 A1* | 8/2012 | Loos | G06K 9/00778 382/103 |
| 2013/0113934 A1* | 5/2013 | Hotta | G06K 9/00778 348/143 |
| 2015/0058049 A1 | 2/2015 | Shaw | |
| 2015/0208043 A1 | 7/2015 | Lee et al. | |
| 2015/0317835 A1* | 11/2015 | Byers | H04L 65/1083 345/633 |
| 2016/0180173 A1* | 6/2016 | Westmacott | G06K 9/00765 382/103 |
| 2016/0191865 A1* | 6/2016 | Beiser | G06K 9/00221 348/156 |
| 2016/0321548 A1 | 11/2016 | Ziskind et al. | |
| 2017/0098153 A1* | 4/2017 | Mao | G06N 3/0445 |
| 2017/0277956 A1* | 9/2017 | Winter | H04N 7/188 |

OTHER PUBLICATIONS

Patino, et al., "Abnormal behaviour detection on queue analysis from stereo cameras", 2015 12th IEEE International Conference on Advanced Video and Signal Based Surveillance (AVSS). 2015, IEEE.

OpenCV; From Wikipedia, the free encyclopedia; https://en.wikipedia.org/wiki/OpenCV; pp. 1-4.

* cited by examiner

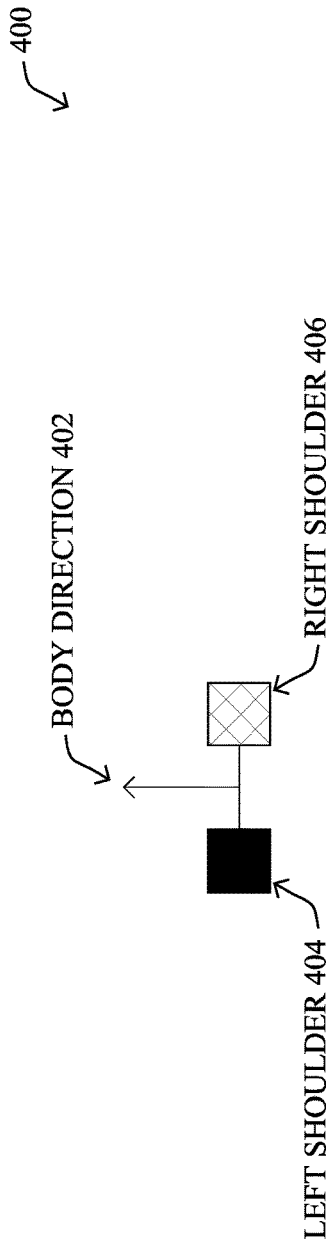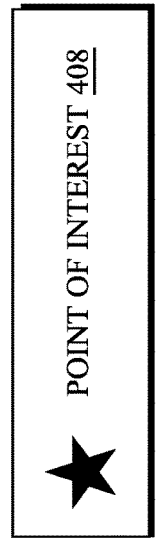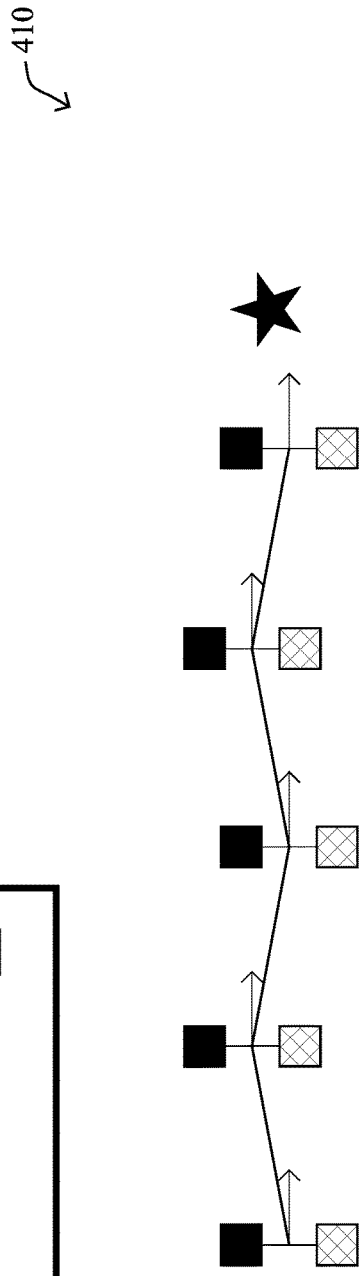
FIG. 4A
FIG. 4B

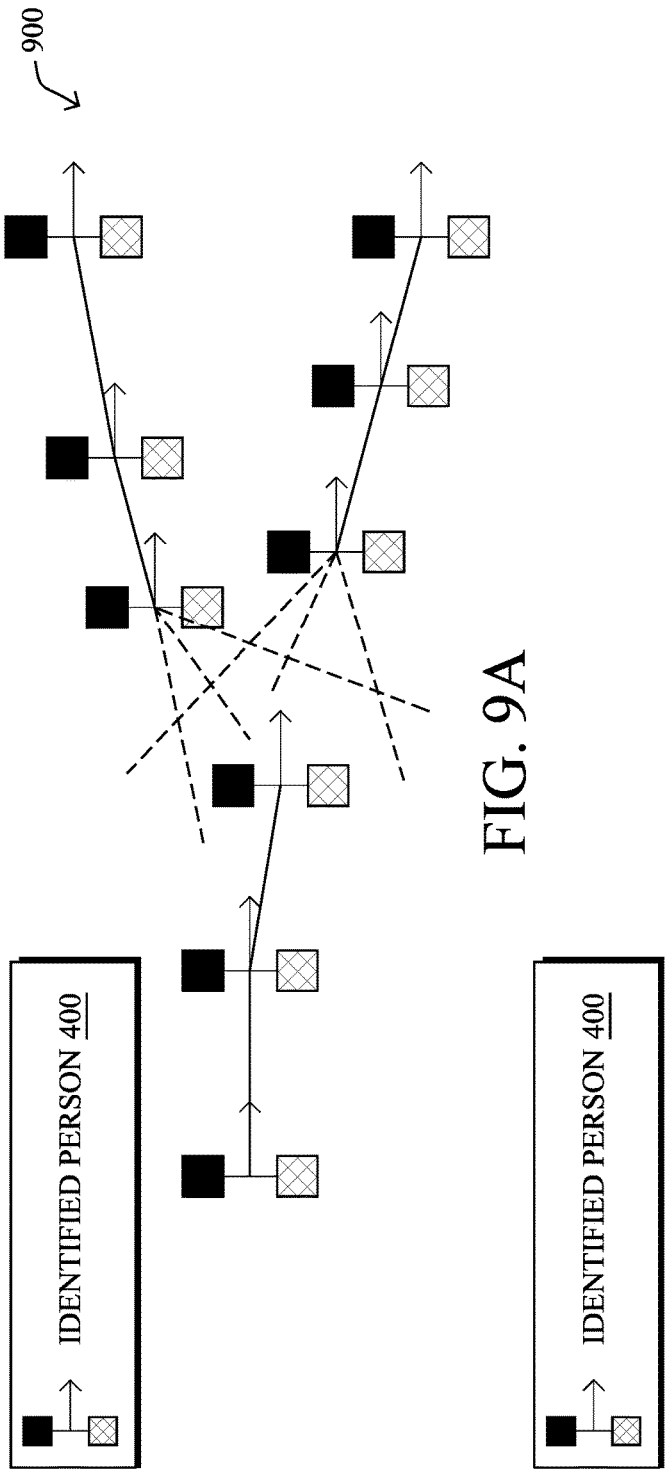
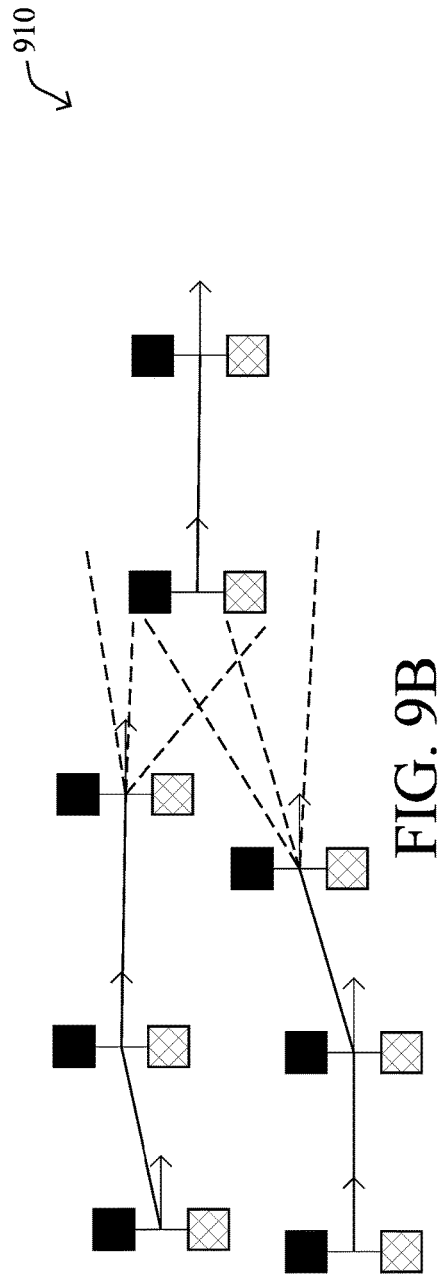
FIG. 9A
FIG. 9B

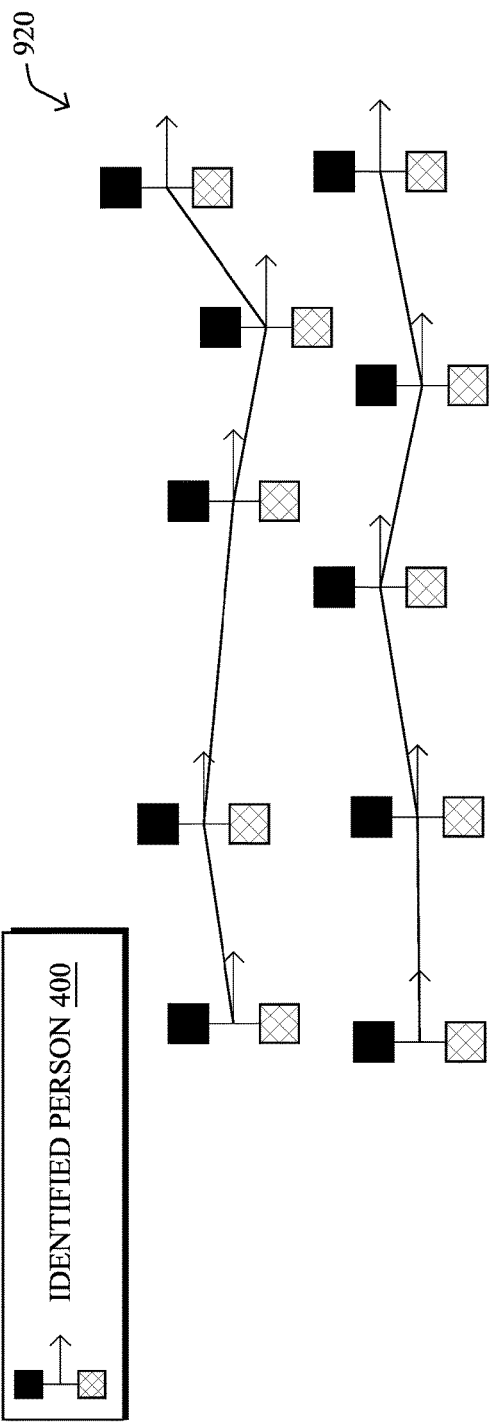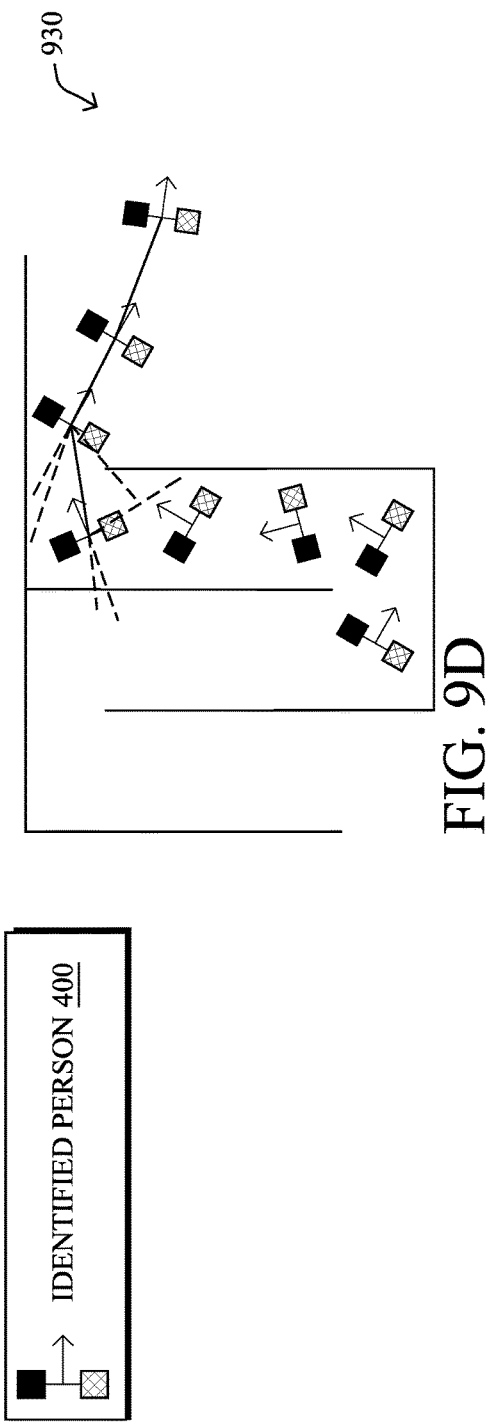
FIG. 9C
FIG. 9D

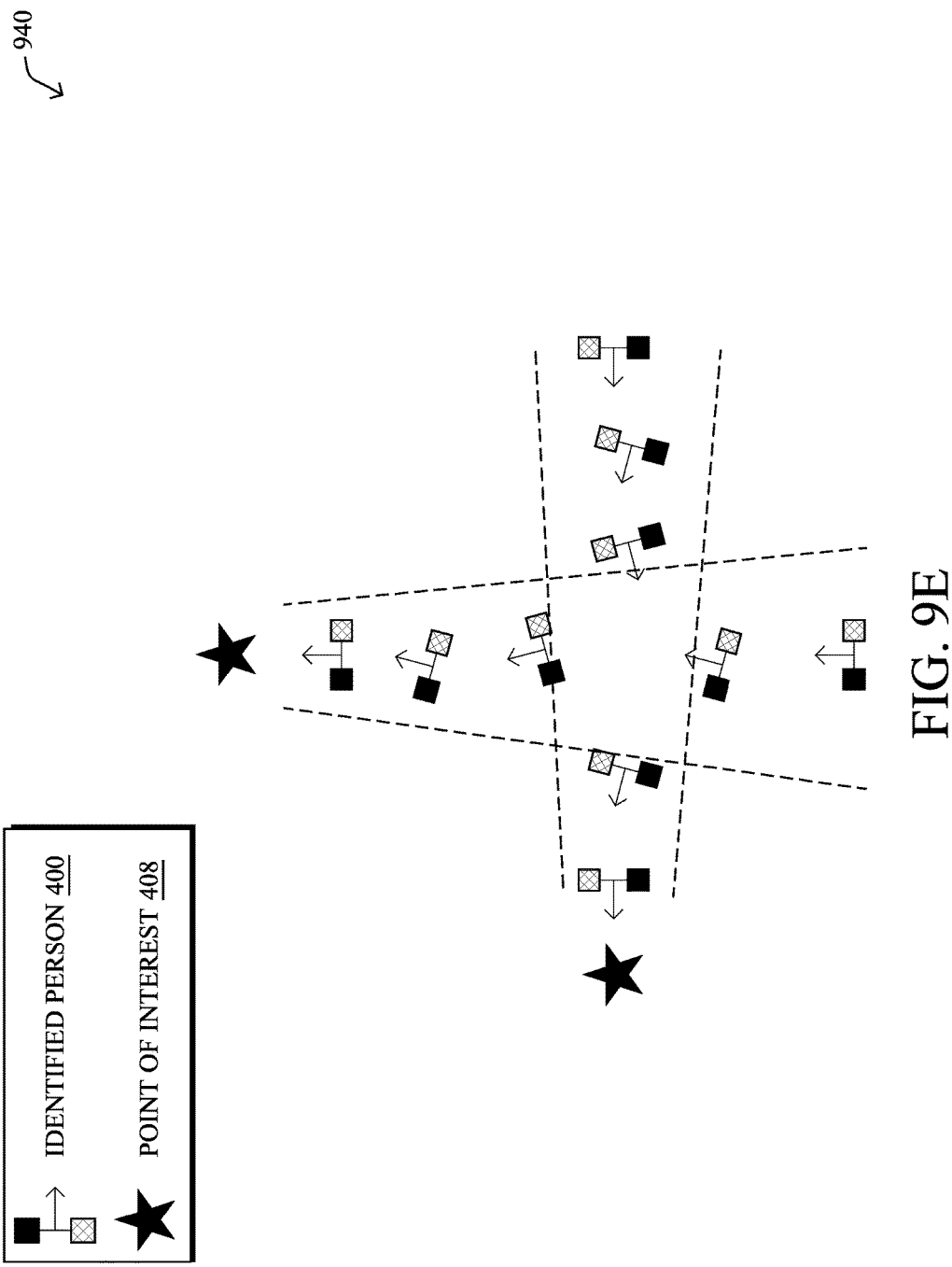

DYNAMIC PERSON QUEUE ANALYTICS

TECHNICAL FIELD

The present disclosure relates generally to computer networks, and, more particularly, to dynamic person queue analytics.

BACKGROUND

A growing field in the area of surveillance systems is person queue analytics, which has application across a number of industries such as transportation, smart cities, retail, enterprise, and the like. Notably, person queue analytics may be able to assess queues (e.g., lines) of people in terms of length, dwell times, abandonment rates, and other metrics. This information can be useful for purposes of improving customer satisfaction, process efficiency, employee productivity, and the like.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A-4B illustrate an example of a person queue represented as an ordered list of nodes;

FIGS. 9A-9E illustrate various queue patterns that can be detected; and

DESCRIPTION OF EXAMPLE EMBODIMENTS

Overview

Figure 1:
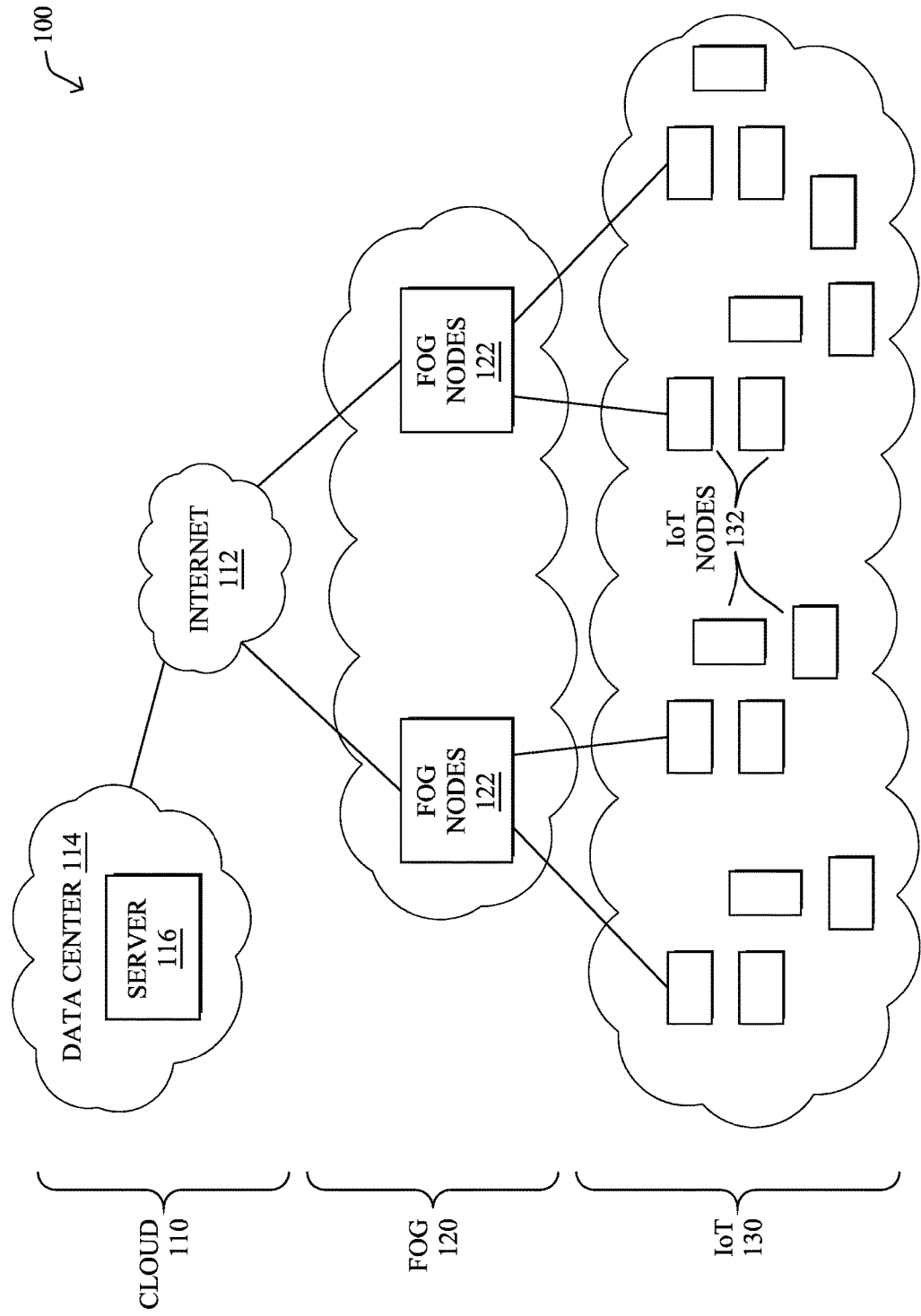
FIG. 1 illustrates an example communication network.

According to one or more embodiments of the disclosure, a device identifies, from image data captured by one or more cameras of a physical location, a focal point of interest and people located within the physical location. The device forms a set of nodes whereby a given node represents one or more of the identified people located within the physical location. The device represents a person queue as an ordered list of nodes from the set of nodes and adds a particular one of the set of nodes to the list based on the particular node being within a predefined distance to the focal point of interest. The device adds one or more nodes to the list based on the added node being within an angle and distance range trailing a forward direction associated with at least one node in the list. The device provides an indication of the person queue to an interface.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

In some embodiments, one implementation of network 100 may include any number of cameras at the IoT layer 130 (e.g., IoT nodes 132). Such cameras may be of any suitable type include, but not limited to, still cameras and video cameras. Further, the cameras may have any number of features, such as color or monochrome image sensors, motion sensors (e.g., to activate the capture of images), infrared sensors (e.g., for night vision capabilities). In turn, the cameras may be connected to any number of fog nodes 122 at fog layer 120 and provide captured image data to fog nodes 122 for further processing at fog layer 120 and/or cloud layer 110. For example, a particular fog node 122 may oversee a set of cameras in an airport terminal and process image data captured by the cameras.

Figure 2:
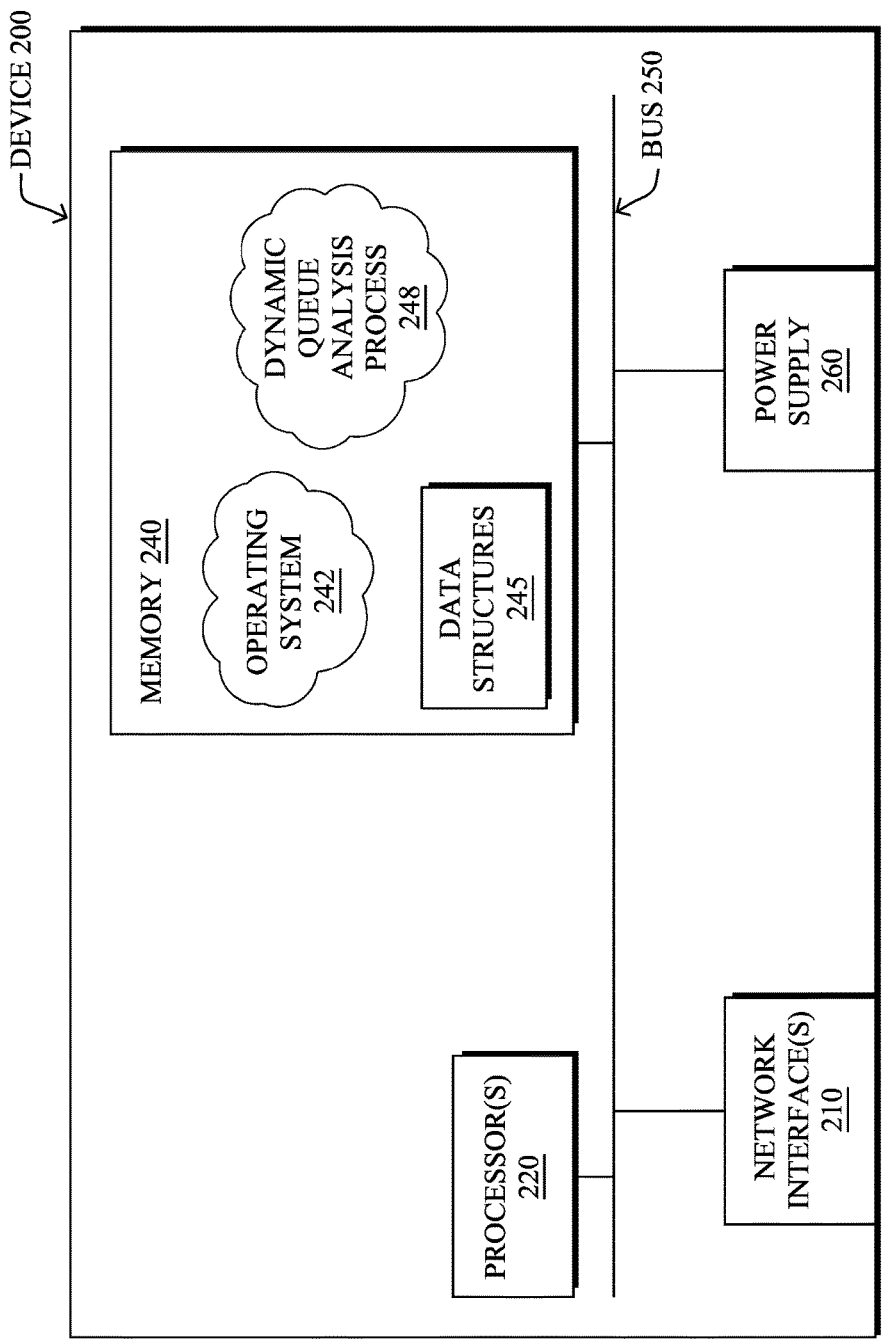
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative dynamic queue analysis process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In general, dynamic queue analysis process 248 may be configured to assess the dynamic formation of person queues from image data captured by one or more cameras. In some embodiments, dynamic queue analysis process 248 may do so by leveraging machine learning, to learn and adapt to the various conditions present in the captured image data. In general, machine learning is concerned with the design and the development of techniques that take as input empirical data (e.g., persons and/or objects present in the image data, etc.), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+ b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, dynamic queue analysis process 248 may employ one or more supervised, unsupervised, or semi-supervised machine learning models. Generally, supervised learning entails the use of a training set of data, as noted above, that is used to train the model to apply labels to the input data. For example, the training data may include examples of people or objects present in images. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that dynamic queue analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like. In one specific embodiment, dynamic queue analysis process 248 may leverage a multi-modal, recurrent neural network (RNN), to perform dynamic queue analysis on captured image data.

The performance of a machine learning model can be evaluated in a number of ways based on the number of true positives, false positives, true negatives, and/or false negatives of the model. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, person queue analytics is a powerful tool that is becoming increasingly prevalent in many security systems. Notably, person queue analytics may be able to assess queues (e.g., lines) of people in terms of length, dwell times, abandonment rates, and other metrics that may be of interest across a large number of different industries.

Typically, person queue analytics approaches begin with a set of presumptions about where a queue is likely to form. For example, retractable barricades in an airport may direct passengers to form a queue in a particular area and direction. While these approaches are fine in the static case, there are many other real-world scenarios that exhibit more complex queuing patterns that are not amenable to current person queue analytic approaches. Notably, some queues form dynamically and in random patterns, making static approaches to person queue analytics inapplicable.

Dynamic Person Queue Analytics

The techniques herein introduce a dynamic approach to queue analytics that eliminates the need for pre-defined queue zones, camera calibration, and other system configurations. In some aspects, a multi-modal tracking approach is proposed that identifies image similarities, performs non-deformable object localization (e.g., shopping bag carts, baskets, bags, etc.), and estimates human poses, while improving the accuracy of the metrics. Further, the techniques herein support both static points of interest (e.g., a fixed location of a checkout register, etc.), as well as mobile points of interest (e.g., an employee with a smartphone application-based payment system, etc.).

Specifically, according to one or more embodiments of the disclosure as described in detail below, a device identifies, from image data captured by one or more cameras of a physical location, a focal point of interest and people located within the physical location. The device forms a set of nodes whereby a given node represents one or more of the identified people located within the physical location. The device represents a person queue as an ordered list of nodes from the set of nodes and adds a particular one of the set of nodes to the list based on the particular node being within a predefined distance to the focal point of interest. The device adds one or more nodes to the list based on the added node being within an angle and distance range trailing a forward direction associated with at least one node in the list. The device provides an indication of the person queue to an interface.

Illustratively, the techniques described herein may be performed by hardware, software, and/or firmware, such as in accordance with the dynamic queue analysis process 248, which may include computer executable instructions executed by the processor 220 (or independent processor of interfaces 210) to perform functions relating to the techniques described herein.

Operationally, the device performing the dynamic person queue analytics (e.g., device 200) may receive image data from any number of cameras of a physical location. Such image data may comprise, for example, captured image frames from the camera(s) over the course of time. In turn, the device may identify people, non-human objects, and/or points of interest depicted within the frames.

Figure 3:
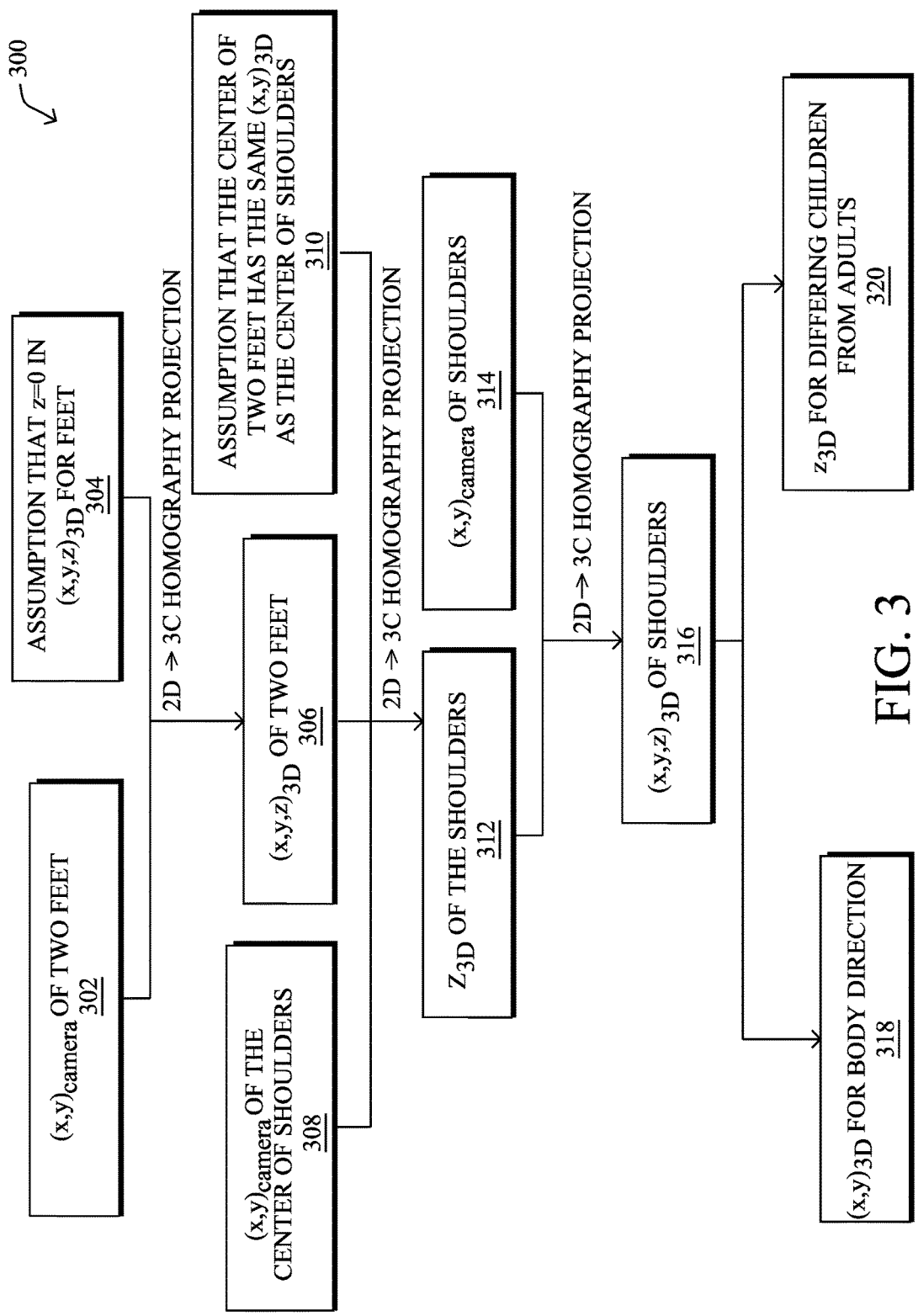
FIG. 3 illustrates an example flow diagram for projecting image frames into three dimensions.

In various embodiments, the analytics device may project the captured two dimensional (2D) image frames into three dimensions. FIG. 3 illustrates a potential simplified procedure for doing so, in one embodiment. As shown in the flow diagram 300 of FIG. 3, the device may begin perform image recognition on a given frame, to identify the feet of people in the image. Notably, at step 302, the device may calculate the (x,y) coordinates of the feet of a given person in the image frame. In turn, at step 304, the device may assume that the feet of that person also exists in three dimensions at z=0. Thus, on identifying the feet of a person in two dimensions, the device can perform a 2D→3D homography projection, thereby projecting the 2D coordinates of the feet into three dimensions as (x,y,z), at step 306.

Similar to the analysis of the feet of the person, the device may also perform a number of analytic steps with respect to the shoulders of the person. Notably, at step 308, the device may identify the center point of the shoulders of the person in question and determine the corresponding 2D coordinates for the center point of the shoulders. At step 310, the device may also make an assumption that the center of the feet of the person is at the same (x,y) coordinates as that of the center of the shoulders in three dimensions. Thus, using the (x,y,z) coordinates of the feet from step 306, the device may perform another 2D→3D homography projection, to compute the z coordinate of the shoulders, at step 312. This z coordinate can then be projected at step 314 with the determined (x,y) coordinates from step 308, to obtain a set of 3D coordinates (x, y, z) for the shoulders at step 316.

From the obtained 3D projections for the shoulders of the identified person, the device can determine a number of different characteristics of the person. For example, at step 318, the (x, y) coordinates in the 3D projections can indicate the direction of the person's body (e.g., by assessing changes in these coordinates over time, etc.). Similarly, the z coordinates for the person's shoulders in the 3D projections can be used to distinguish the person as a child or adult. In particular, the person's height may be in proportion to the z coordinate of the person's shoulders in the 3D projection, allowing the device to label the person based on the height range associated with the person (e.g., a person that is 6 feet tall may be identified as an adult, etc.).

Once a video frame is assessed using the above approach, queue analytics can be performed in 2D on the various people identified in the frame. In particular, FIG. 4A illustrates one example 2D representation 400 of an identified person. As shown, representation 400 may generally comprise the locations 404-406 of the left and right shoulders of the person. Associated with the person may also be a body direction 402, such as the direction calculated above in step 318 of FIG. 3.

Using the 2D representations of the identified people from the image data, the device may represent a person queue as a ranked/ordered list of nodes. In various embodiments, a node may represent any or all of the following:

- a single person;
- a group of people, as described below;
- a non-human object of interest, such as a shopping cart, luggage, wheelchair, or any other object for which the device is trained to identify and may accompany a person in a dynamically formed queue.

For example, FIG. 4B illustrates an example person queue 410 comprising single person nodes/representations 400a-400e. More complex person queues may also comprise nodes that represent non-human objects (e.g., shopping carts, etc.) and/or nodes that group any number of identified people from the image data together (e.g., people identified to be traveling together within the physical location).

In various embodiments, a person queue, such as queue 410 shown, may be centered at a point of interest 408 that the device may also identify from the image data and/or other sensor data that may be available from the network. In many cases, point of interest 408 may be of a known type. For example, point of interest 408 may be a person equipped with a smartphone or other mobile checkout device, in which case Bluetooth Low Energy (BLE), Wi-Fi, or other form of wireless location services could be leveraged to identify the location of the point of interest. Further examples of a point of interest may include a security checkpoint, cashier or checkout station, or the like. In a more general case, clustering could also be used to identify a mobile and/or spontaneous point of interest within a physical location.

The nodes of person queue 410 may be ordered or ranked relative to point of interest 408. Notably, node 400e may be of the highest or lowest rank within queue 410, depending on implementation, based on it being in closest proximity to point of interest 408. In turn, nodes 400d, 400c, 400b, and 400a may follow in order, based on their increasing distance to point of interest 408. Such information can be used, for example, for purposes of estimating queue wait times, predicting changes to queue 410 (e.g., whether a member of queue 410 is likely to leave queue 410, etc.), or other analysis of queue 410.

Figure 5:
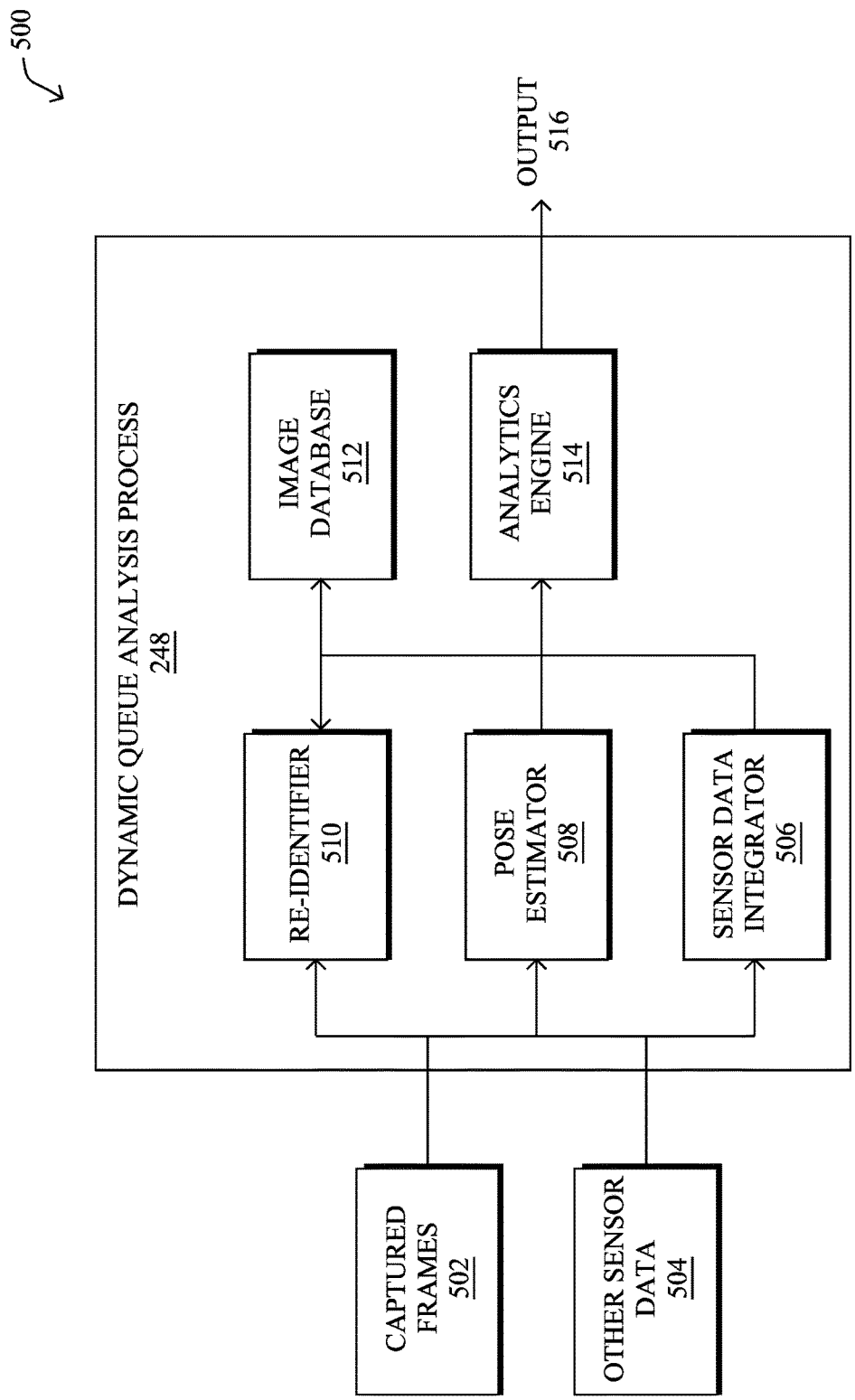
FIG. 5 illustrates an example architecture for performing dynamic queue analysis.

FIG. 5 illustrates an example architecture 500 for performing dynamic queue analysis, according to various embodiments. As shown, dynamic queue analysis process 248 may include any or all of the following components: a sensor data integrator 506, a pose estimator 508, a re-identifier 510, an image database 512, and/or an analytics engine 514. Further, these components 506-514 may be implemented in a distributed manner or on a singular device. In the case of distributed implementations, the devices executing the components of dynamic queue analysis process 248 may be viewed as a single device/system. In addition, the functionalities of the components of architecture 500 may be combined, omitted, or implemented as part of other processes, as desired.

As shown, dynamic queue analysis process 248 may receive captured frames 502 from any number of cameras via the network. In addition, in various embodiments, dynamic queue analysis process 248 may receive other sensor data 504 from any number of other sensors or systems connected to the network. For example, other sensor data 504 may include location data sensed from wireless connections between the network and devices in the physical location depicted in captured frames 502. Example wireless localization mechanisms may include Connected Mobile Experiences (CMX) or Meraki from Cisco Systems, Inc., or other systems that provide similar functionality (e.g., by triangulating wireless signals associated with a mobile device, etc.).

Sensor data integrator 506 may combine information extracted from captured frames 502 and other sensor data 504, to better localize and track people and objects across time and cameras. Notably, sensor data integrator 506 may perform sensor fusion, to correlate captured frames 502 with other sensor data 504. For example, sensor data integrator 506 may associate a location of a mobile device from other sensor data 504 detected at a certain time with one or more of captured frames 502 at the same time.

Re-identifier 510 may be configured to identify image similarities across captured frames 502, to persistently track people depicted in captured frames 502. For example, one image may depict a person at coordinates (x, y) at time $t_1$ and at coordinates (x', y') at time $t_2$. By analyzing captured frames 502 from different points in time and/or from different cameras, re-identifier 510 may determine that the same person is depicted. Re-identifier 510 may also leverage sensor data integrator 506, to further refine its re-identification of a person across captured frames 502. For example, if the person is carrying a mobile device, location data in other sensor data 504 can be leveraged to better pinpoint that person in captured frames 502.

In further embodiments, re-identifier 510 may be configured to identify specific objects depicted within captured frames 502. For example, similar to identifying people that may participate in a person queue from captured frames 502, person re-identifier may also identify shopping carts, luggage, or other non-human objects that may be located within a person queue. Further, re-identifier 510 may be configured to identify focal points of interest depicted in captured frames 502 that may be the focus of a formed person queue (e.g., a mobile checkout, a security checkpoint, etc.).

Pose estimator 508 may be configured to determine the pose of a person depicted in captured frames 502. For example, pose estimator 508 may use the above techniques to identify the feet and/or shoulders of the person. In turn, pose estimator 508 may determine the direction that the person is facing (e.g., based on the positions of the person's shoulders or feet, changes in location over time, etc.).

To aid in the re-identification or pose estimations, dynamic queue analysis process 248 may store captured frames 502, other sensor data 504, and/or the outputs of components 506-510 in image database 512. In some embodiments, database 512 may be encrypted, thereby protecting the data from unauthorized access. In such cases, the components of dynamic queue analysis process 248 may decrypt the data stored in image database 512 as needed, as well as encrypting any data for storage in database 512.

In various embodiments, dynamic queue analysis process 248 may further include a machine learning-based analytics engine 514 configured to detect dynamically formed person queues from captured frames 502. More specifically, analytics engine 514 may assess the output data from components 506, 508, and/or 510, to represent people, groups of people, and/or non-human objects as potential nodes in a person queue. In turn, as described in greater detail below, analytics engine 514 may add nodes from the set of identified nodes to a list that represents a given queue. In one embodiment, analytics engine 514 may use a multi-modal, recurrent neural network, to perform the queue detection. In further embodiments, analytics engine 514 may also determine additional characteristics of a given queue, such as a person count, estimated wait time, or the like.

Analytics engine 514 may provide its generated outputs 516 to an interface, such as a network interface of the device executing dynamic queue analysis process 248 or a user interface (e.g., a display). For example, analytics engine 514 may provide an indication of a detected person queue for local or remote presentation to a user (e.g., as an overlay on captured frames 502, as a graphic, a characteristic of the queue, etc.).

Figure 6:
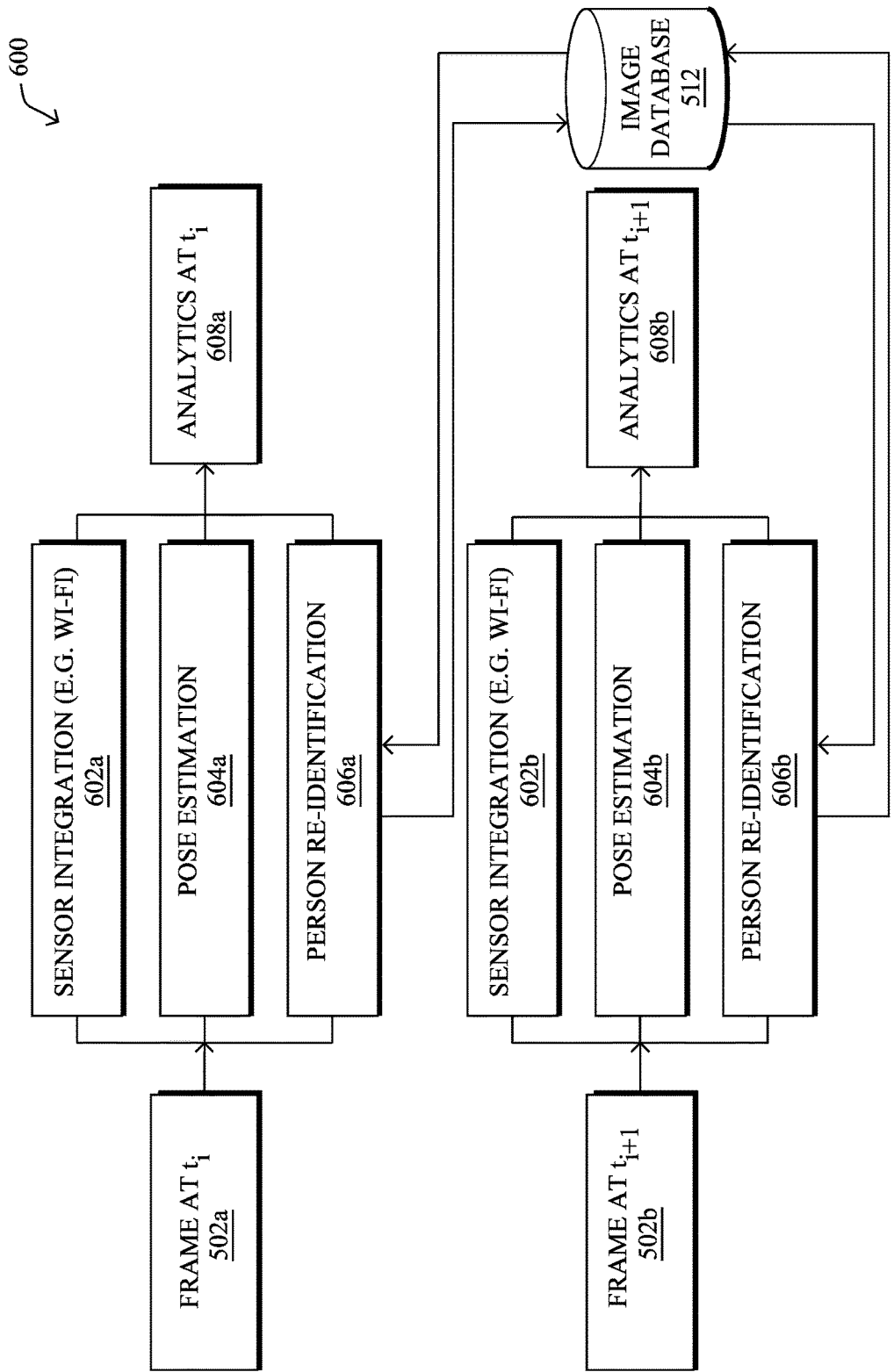
FIG. 6 illustrates an example diagram of the assessment of image frames over time.

FIG. 6 illustrates an example diagram 600 of the assessment of image frames over time by architecture 500, according to various embodiments. As shown, assume that architecture 500 receives a frame 502a associated with time $t_i$. In turn, architecture 500 may perform sensor integration (step 602a), pose estimation (step 604a), and person re-identification (606a) on frame 502a, leveraging stored results and prior frames in image database 512. Similarly, architecture 500 may perform the same operations (e.g., steps 602b, 604b, and 606b) on the next frame, frame 502b, that is associated with time $t_{i+1}$. In turn, architecture 500 may compare the analytics 608a-608b of frames 502a-502b, as part of its identification of a person queue.

By way of more specific example, assume that frame 502a indicates that a person A is located at (x, y). A Wi-Fi device D may also be located at $(x_D, y_D)$. From the frames and other data that precede frame 502a, architecture 500 may determine that D is A's personal device, since the two always travel together, etc. From frame 502b, now assume that a new person A' is detected at (x', y'). This presents a question: is A' the same person as A seen in previous frames? Based on the location difference (x'−x, y'−y), the pose differences (if any), the image similarity, the location of D (e.g., does D stay very close to A'), architecture 500 can determine whether A and A' are the same person or different people.

As noted above, some implementations of the techniques herein provide for the grouping of multiple people into a single node, for purposes of detecting person queues. In particular, an assumption can be made that when a group of people travel together to a physical location, they may have a higher frequency of meeting each other later on in time. Using the person re-identification across images captured from non-overlapping cameras, the system may group these people as a single node for purposes of identifying a person queue.

Figure 7:
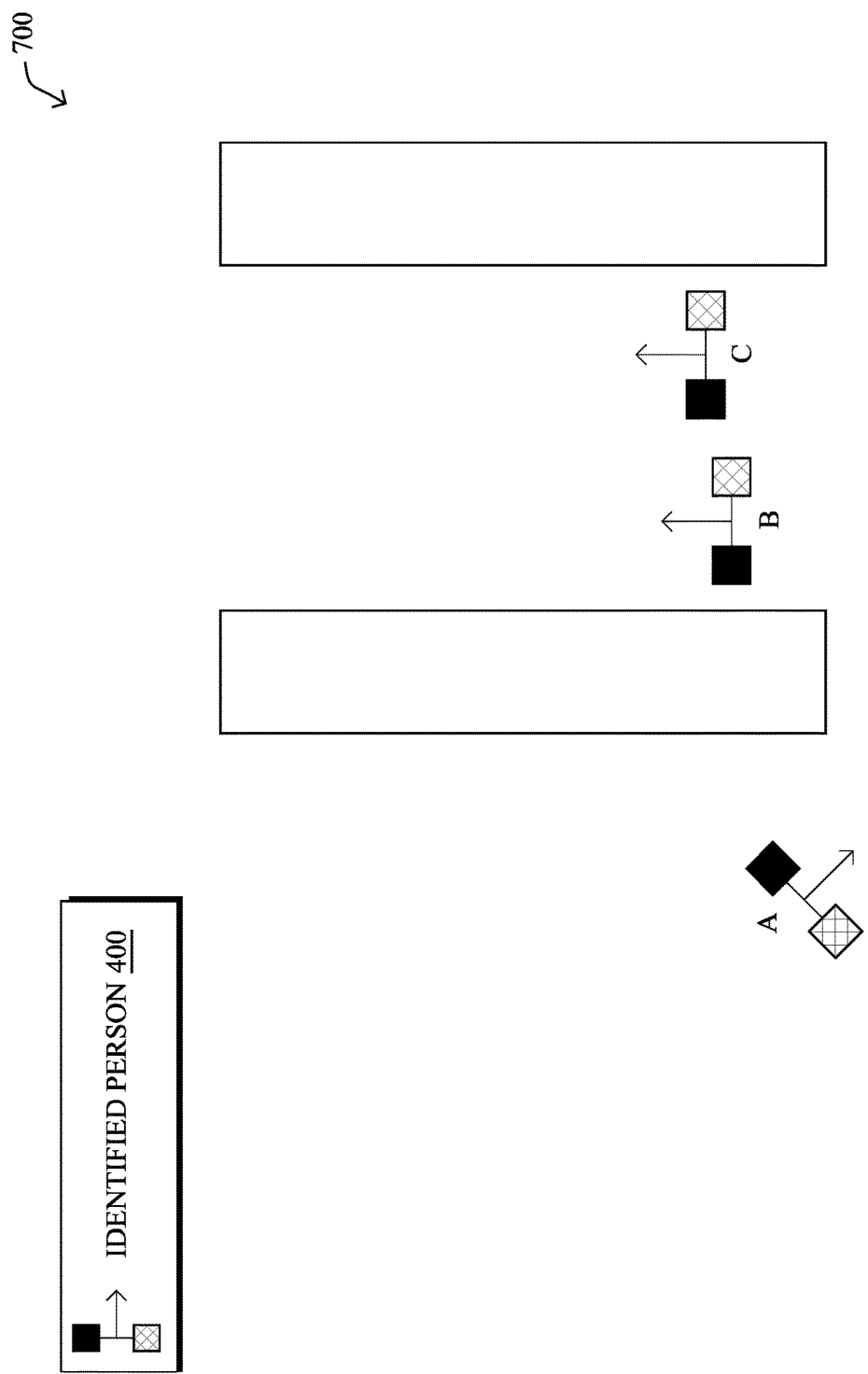
FIG. 7 illustrates an example of grouping people as a single node.

By way of example, FIG. 7 illustrates an example of grouping people as a single node. As shown, assume that people A-C were observed entering a building together, but subsequently split into separate groups. Notably, assume that people B-C continued to stay together (e.g., based on their postures, tracked movement, etc.), but that person A split from the group. Depending on the location, the system may continue to group people A-C together as a single node for purposes of queue analytics. For example, in a retail environment, it is a reasonable assumption that people A-C will meet up again at a checkout area, if they entered the retailer together. Note that if people A-C decide to check out individually, the analytics system may still treat the people as individual nodes, instead.

Figure 8:
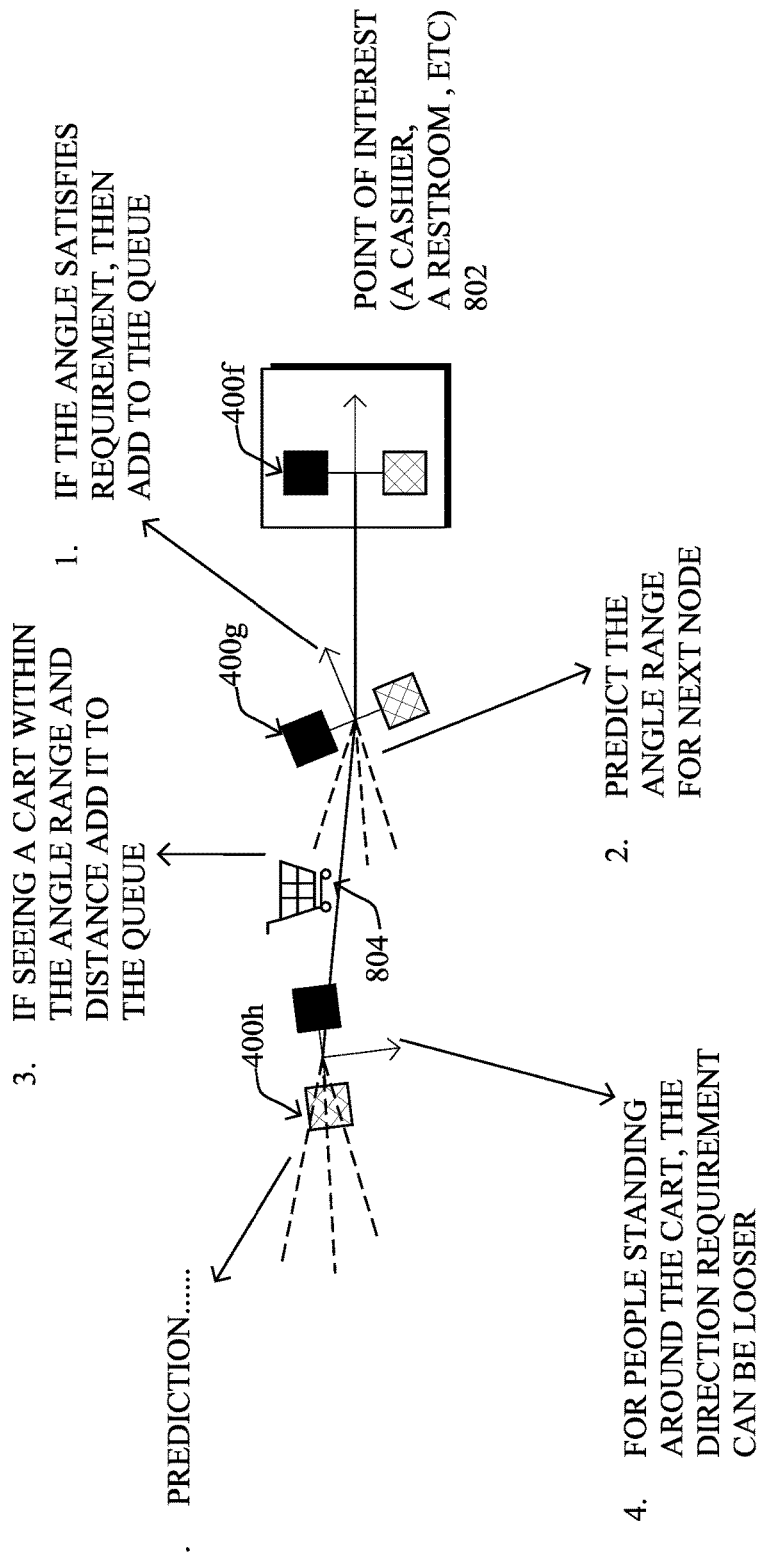
FIG. 8 illustrates an example of the detection of a person queue.

FIG. 8 illustrates an example of the detection of a person queue 800, according to various embodiments. During operation, the system may first identify the people, objects, and focal points of interest located within the physical location. For example, as shown, the system may assess image data captured by one or more cameras in the area to identify point of interest 802 (e.g., a cashier, a restroom, etc.), people 400f-400h, and object 804 (e.g., a shopping cart). In turn, the system may represent each of people 400f-400h and object 804 as different nodes.

The system may detect that person 400f is within a predefined distance of point of interest 802 and add the node that represents person 400f to a list that represents person queue 800. To determine which of the nodes should also be added to the list, the device may assess whether person 400g is within a trailing angle and/or distance from person 400f (e.g., trailing relative to the forward direction of person 400f). If so, the node that represents person 400g may also be added to the queue list. The device may then predict the next trailing angle and/or distance range for person 400g. In this case, rather than a person being within the trailing angle and/or distance range for person 400g, there may be object 804 (e.g., a shopping cart).

Since object 804 is within the predicted distance and angle range of person 400g, the device may add the node that represents object 804 to the queue list. The procedure may then continue on by predicting a trailing angle and distance range for object 804 and determining whether person 400h is within these ranges. If so, the device may add the node representing person 400h to the queue. In some embodiments, since object 804 is a shopping cart, the device may use a wider angle range than for a person, to identify the next node to be added to the queue list. This process may continue on as many times as needed, until no more of the nodes identified from the image data for the physical location are within the predicted range and distance of the most recently added node to the list of nodes that represents person queue 800.

In various embodiments, temporal information could also be feed into the multi-modal recurrent neural network of the device, to regress the angle range and acceptable distance from previous customer to distinguish a number of different queue patterns. FIGS. 9A-9E illustrate various example queue patterns that can be detected, in this way. Notably, FIG. 9A illustrates a fan out pattern 900 that can be detected assessing the overlapping trailing angles and distances of various nodes. FIG. 9B illustrates the opposite case of a fan in pattern 910 whereby multiple nodes are within the trailing angle and distance to the current node. In FIG. 9C, a parallel queue pattern 920 can be identified. In FIG. 9D, zig-zag patterns 930 can also be identified, such as when the person queue snakes around a corner, etc. Finally, in FIG. 9E, the system can also identify multiple queues 940 associated with different points of interest 408. Notably, even though the queues in FIG. 9E intersect, by controlling the angles and distances used for node selection, the system can also distinguish between nodes/people that are very close to one another, but are in separate queues.

Another functionality of the techniques herein is the estimation of certain times associated with an identified person queue. In various embodiments, these times may include queue wait times (e.g., overall, for a particular person, etc.) and/or service times (e.g., an amount of time taken before the node at the head of the queue drops out of the queue (e.g., a user completes their checkout, screening, etc.), and/or further aggregate measures.

For example, the system may estimate the service time based on the logical queue size, which is affected by the estimated service time of each customer or a group. More specifically, a person node may have a fixed average service time, while a group node may have an average service time based on the size of the node and a reduction factor (e.g., serving a group of three people will take less time than serving three individuals, by a factor alpha). This alpha factor can also be automatically learned from historical measurement.

Figure 10:
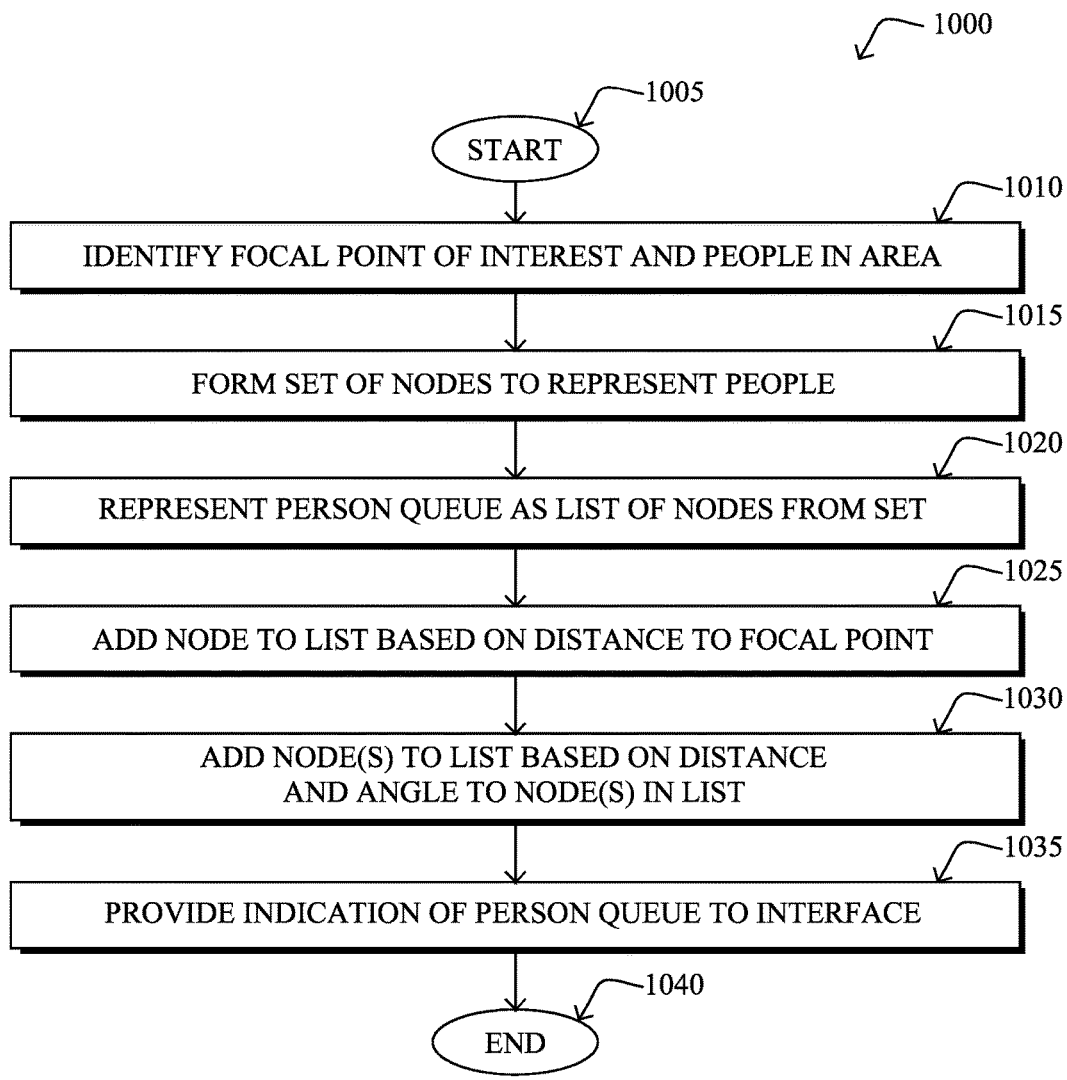
FIG. 10 illustrates an example simplified procedure for performing dynamic person queue analytics.

FIG. 10 illustrates an example simplified procedure for performing dynamic person queue analytics, according to various embodiments. For example, a non-generic, specifically configured device (e.g., device 200) may perform procedure 1000 by executing stored instructions (e.g., process 248). The procedure 400 may start at step 405, and continues to step 1010, where, as described in greater detail above, the device may identify, from image data captured by one or more cameras of a physical location, a focal point of interest and people located in the physical location. In general, a focal point of interest may be any person, object, or sub-location that may draw people to form a queue (e.g., a mobile checkout, a restroom, a security checkpoint, etc.). In some embodiments, the device may also leverage wireless location services in the network, to help identify the people and focal point of interest. For example, if a person carrying a mobile scanner is the point of interest, the device may use location information regarding the scanner, to enhance its identification of the point of interest.

At step 1015, as detailed above, the device may form a set of nodes to represent the identified people from step 1010. In some embodiments, a single node may represent a person or, alternatively, a group of people that were traveling together. In a further embodiment, a node may also represent an identified non-human object that may be expected to form part of the person queue, such as luggage or a shopping cart. In some cases, a node may comprise a set of coordinates (e.g., the center point of a person's shoulders), as well as a direction at which the person is facing. In the case of a group, the members of the group, an aggregate direction may be used.

At step 1020, the device may represent a person queue as an ordered list of nodes from the set of nodes, as described in greater detail above. Such an ordered list may, for example, be ordered based on the distance or number of nodes between a given node and the point of interest.

At step 1025, as detailed above, the device may add a node to the list based on the node being within a predefined distance to the focal point of interest. For example, if the node represents a person and the person is within a short distance to the point of interest (e.g., a foot, several feet, etc.), the device may add the node to the list that represents the person queue.

At step 1030, as detailed above, the device may also add one or more other nodes to the list based on the added node being within an angle and distance range trailing a forward direction associated with at least one node in the list. For example, after a first node is added to the list based on its distance to the focal point of interest, the device may assess the other nodes in the set, to determine whether any of the other nodes are within a trailing distance and/or angle range to the node closest to the point of interest. If so, that node may also be added to the list that represents the person queue. This may be repeated any number of times until there are no more eligible nodes to add to the list. In some embodiments, the device may employ a machine learning-based process, such as a multimodal recurrent neural network for this analysis (e.g., to assess different angle or distance ranges to detect different queue patterns, etc.).

At step 1035, the device may provide an indication of the identified queue to an interface, as described in greater detail above. Such an interface may be a local user interface or a network interface, to provide the indication to a remote device. In some cases, the indication may be a graphic or other depiction of the identified queue (e.g., as an overlay on a camera frame or stream, as a 2D graphic, etc.). However, in further cases, the indication may also be a characteristic or metric derived from the identified queue, such as a service or wait time, a person count, or the like. Procedure 1000 then ends at step 1040.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the detection of dynamic person queues that can be formed anywhere and/or at any time in a given area. This allows the system to use inexpensive, commodity cameras and does not require any specialized configuration, such as would be needed in the static queue case. Further, the techniques herein allow for the determination of highly accurate metrics regarding a detected queue, such as wait times and person counts.

While there have been shown and described illustrative embodiments that provide for dynamic person queue analytics, it is to be understood that various other adaptations and modifications may be made within the spirit and scope of the embodiments herein. For example, while certain embodiments are described herein with respect to using certain models for purposes of person re-identification and queue identification, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   identifying, by a device and from image data captured by one or more cameras of a physical location, a focal point of interest and people located within the physical location;
   forming, by the device, a set of nodes, wherein a given node represents one or more of the identified people located within the physical location;

representing, by the device, a person queue as an ordered list of nodes from the set of nodes;

adding, by the device, a particular one of the set of nodes to the list based on the particular node being within a predefined distance to the focal point of interest;

adding, by the device, one or more nodes to the list based on the added node being within an angle and distance range trailing a forward direction associated with at least one node in the list, wherein the angle and the distance range are determined using a multimodal recurrent neural network;

regressing, by the device, the angle and distance range by using temporal information as input to the multimodal recurrent neural network to identify a queue pattern of the person queue comprising at least one of: a fan out pattern for the person queue, a fan in pattern for the person queue, a person queue that is parallel to the person queue, or a zig zag pattern of the person queue; and providing, by the device, an indication of the person queue and the queue pattern to an interface.

2. The method as in claim 1, wherein forming the set of nodes comprises:

performing, by the device, person re-identification across the image data from non-overlapping cameras to identify a subset of the people that traveled together at a point in time; and grouping, by the device, the subset of the people as a single node based on the subset of the people traveling together at a point in time.

3. The method as in claim 1, wherein identifying the focal point of interest and people located within the physical location from the captured image data comprises:

locating, by the device, the people within the image data based in part on wireless network signals.

4. The method as in claim 1, further comprising:

identifying, by the device, a second focal point of interest within the physical location; and determining, by the device, a second person queue that begins at the second focal point of interest.

5. The method as in claim 1, further comprising:

determining, by the device, the forward direction associated with the at least one node in the list by:

identifying shoulders of the one or more people represented by the at least one node; and forming a two dimensional (2D) representation of the one or more people based on the identified shoulders of the one or more people; and tracking the 2D representation of the one or more people over time.

6. The method as in claim 1, further comprising:

tracking, by the device, movement of the nodes over time; and estimating, by the device, a wait time metric for the person queue based on the tracked movement of the nodes over time, wherein the indication of the person queue provided to the interface comprises the estimated wait time.

7. The method as in claim 1, wherein at least one of the nodes added to the list represents a non-human object.

8. An apparatus, comprising:

one or more network interfaces to communicate with a network;

a processor coupled to the network interfaces and configured to execute one or more processes; and a memory configured to store a process executable by the processor, the process when executed configured to:

identify, from image data captured by one or more cameras of a physical location, a focal point of interest and people located within the physical location;

form a set of nodes, wherein a given node represents one or more of the identified people located within the physical location;

represent a person queue as an ordered list of nodes from the set of nodes;

add a particular one of the set of nodes to the list based on the particular node being within a predefined distance to the focal point of interest;

add one or more nodes from the set to the list based on the added node being within an angle and distance range trailing a forward direction associated with at least one node in the list, wherein the angle and the distance range are determined using a multimodal recurrent neural network;

regress the angle and distance range by using temporal information as input to the multimodal recurrent neural network to identify a queue pattern of the person queue comprising at least one of: a fan out pattern for the person queue, a fan in pattern for the person queue, a person queue that is parallel to the person queue, or a zig zag pattern of the person queue; and provide an indication of the person queue and the queue pattern to an interface.

9. The apparatus as in claim 8, wherein the apparatus forms the set of nodes by:

performing person re-identification across the image data from non-overlapping cameras to identify a subset of the people that traveled together at a point in time; and grouping the subset of the people as a single node based on the subset of the people traveling together at a point in time.

10. The apparatus as in claim 8, wherein the apparatus identifies the focal point of interest and people located within the physical location from the captured image data by:

locating, by the device, the people within the image data based in part on wireless network signals.

11. The apparatus as in claim 8, wherein the process when executed is further configured to:

identify a second focal point of interest within the physical location; and determine a second person queue that begins at the second focal point of interest.

12. The apparatus as in claim 8, wherein the process when executed is further configured to:

determine the forward direction associated with the at least one node in the list by:

identifying shoulders of the one or more people represented by the at least one node; and forming a two dimensional (2D) representation of the one or more people based on the identified shoulders of the one or more people; and tracking the 2D representation of the one or more people over time.

13. The apparatus as in claim 8, wherein the process when executed is further configured to:

tracking, by the device, movement of the nodes over time; and estimating, by the device, a wait time metric for the person queue based on the tracked movement of the nodes over time, wherein the indication of the person queue provided to the interface comprises the estimated wait time.

14. The apparatus as in claim 8, wherein at least one of the nodes added to the list represents a non-human object.

15. The apparatus as in claim 8, wherein the apparatus comprises a fog computing node in communication with the one or more cameras via the network.

16. A tangible, non-transitory, computer-readable media having software encoded thereon, the software when executed by a device cause the device to perform a process comprising:
    identifying, by the device and from image data captured by one or more cameras of a physical location, a focal point of interest and people located within the physical location;
    forming, by the device, a set of nodes, wherein a given node represents one or more of the identified people located within the physical location;
    representing, by the device, a person queue as an ordered list of nodes from the set of nodes;
    adding, by the device, a particular one of the set of nodes to the list based on the particular node being within a predefined distance to the focal point of interest;
    adding, by the device, one or more nodes to the list based on the added node being within an angle and distance range trailing a forward direction associated with at least one node in the list wherein the angle and the distance range are determined using a multimodal recurrent neural network;
    regressing, by the device, the angle and distance range by using temporal information as input to the multimodal recurrent neural network to identify a queue pattern of the person queue comprising at least one of: a fan out pattern for the person queue, a fan in pattern for the person queue, a person queue that is parallel to the person queue, or a zig zag pattern of the person queue; and
    providing, by the device, an indication of the person queue and the queue pattern to an interface.

* * * * *